United States Patent [19]
Dikhoff et al.

[11] 3,957,678
[45] May 18, 1976

[54] METHOD OF MANUFACTURING A LUMINESCENT SULFIDE

[75] Inventors: Johannes Aloysius Maria Dikhoff; Gijsbertus Marinus Smith, both of Eindhoven, Netherlands

[73] Assignee: U.S. Philips Corporation, New York, N.Y.

[22] Filed: Jan. 7, 1974

[21] Appl. No.: 431,439

[30] Foreign Application Priority Data
Jan. 11, 1973 Netherlands ................. 7300382

[52] U.S. Cl. .................................. 252/301.6 S
[51] Int. Cl.² ............... C09K 11/30; C09K 11/18; C09K 11/14
[58] Field of Search ............... 252/301.6 S, 301.4 S; 423/561

[56] References Cited
UNITED STATES PATENTS

| | | | |
|---|---|---|---|
| 2,623,858 | 12/1952 | Kroger | 252/301.6 S |
| 3,655,575 | 4/1972 | Faria et al. | 252/301.6 S |
| 3,704,232 | 11/1972 | Frey et al. | 252/301.6 S |

*Primary Examiner*—Jack Cooper
*Attorney, Agent, or Firm*—Frank R. Trifari; Norman N. Spain

[57] ABSTRACT

A method of manufacturing a luminescent sulfide of zinc and/or cadmium, which sulfide is self-activated or is activated by silver, copper and/or gold and coactivated by aluminum, gallium, indium, scandium and/or the rare earths. Introduced into a reaction vessel are: a reaction mixture (*a*) comprising zinc and/or cadmium sulfide and the activator and coactivator elements in the desired quantities and furthermore a material (*b*) from which a carbon-sulfur compound and/or hydrogen sulfide can be produced upon heating. The reaction vessel is subsequently closed and is then heated at 950 – 1250°C. The material (*b*) in the reaction vessel is separated by a partition from the reaction mixture (*a*) and material transport between (*b*) and (*a*) can take place through the gas phase.

7 Claims, 1 Drawing Figure

U.S. Patent   May 18, 1976   3,957,678
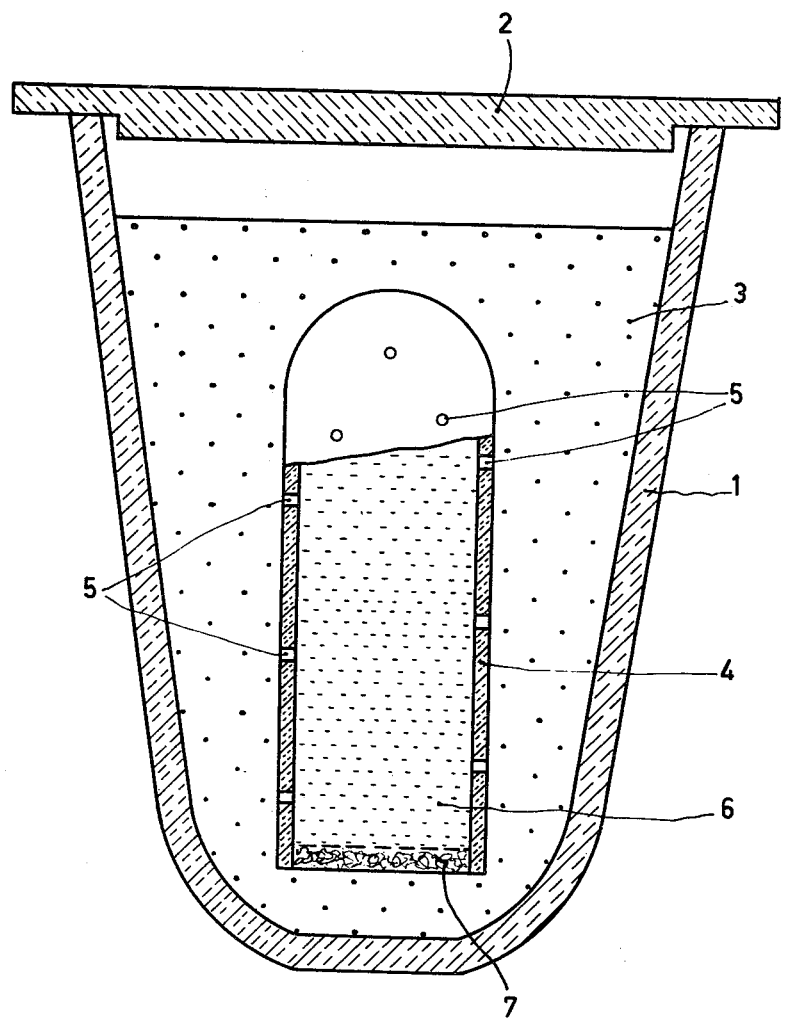

METHOD OF MANUFACTURING A LUMINESCENT SULFIDE

The invention relates to a method of manufacturing a luminescent sulfide of at least one of the elements zinc and cadmium and to a luminescent sulfide obtained by such a method. Furthermore the invention relates to a cathode-ray tube provided with such a luminescent sulfide.

As is known the sulfides of zinc and cadmium and also the zinc-cadmium sulfides constitute excellent fundamental lattices for activation by univalent activator materials such as silver, copper and gold. Materials are then obtained which luminesce very efficiently upon excitation by various excitation means such as electrons, ultraviolet radiation or X-ray radiation. Also the so-called self-activated sulfides which do not contain alien activator elements are efficient luminescent materials. It has been stated, that these self-activated sulfides contain small quantities of univalent zinc or cadmium ions which constitute the luminescent centres. The luminescent sulfides are particularly used frequently in cathode-ray tubes for displaying images, for example, television images both in black and white and in colours.

High radiation efficiencies can only be obtained with the luminescent sulfides when the activator element is satisfactorily built in the fundamental lattice. In order to obtain a satisfactory build-in of the said univalent activators in the fundamental lattice which is built up of bivalent ions a charge compensation is necessary. As is known this charge compensation can be obtained by building univalent anions, for example, halogens together with the univalent activator ions in the lattice. Furthermore it is possible to achieve the said charge compensation by building trivalent cations in the fundamental lattice in addition to the univalent activator ions (see the article by Kröger and Dikhoff in Physica XVI, no. 3, 1950, page 297 and U.S. Pat. No. 2,623,858). The trivalent metals aluminium, gallium, indium, scandium and the rare earths are suitable for this. (In this description and the claims the elements yttrium and lanthanum are also included among the rare earths). The elements used for charge compensation are generally referred to as co-activators. Also in the case of the self-activated sulfides it is necessary to build in a co-activator to obtain an efficient luminescent material. As compared with coactivation by means of halogens, coactivation by means of the said trivalent metals has inter alia the advantage that the ratio of the quantities of activator and co-activator can better be controlled so that very satisfactory reproducible materials are obtained.

The sulfides coactivated by trivalent metals are generally manufactured by heating a reaction mixture, comprising sulfide or zinc and/or of cadmium and the activator and co-activator elements at a high temperature, for example, a temperature of between 950° and 1250°C. This heat treatment is preferably effected in a sulfur-containing atmosphere, because in such an atmosphere the trivalent coactivator is satisfactorily taken up in the sulfide lattice. It is known to pass during the heat treatment a gas mixture comprising hydrogen sulfide ($H_2S$) and/or carbon disulfide ($CS_2$) through the reaction vessel in which the reaction mixture is present. This method has the drawback that operations are to be carried out with comparatively complicated furnace equipment which is especially disadvantageous in large scale manufacture. A great drawback of the known method is that an extensive installation is required to obtain the said gas mixture and to transport it to the furnace. Since the used gas mixture is very toxic and smells unpleasently, extensive safety precautions are necessary.

A method of manufacturing aluminium-coactivated sulfides in which the above-mentioned drawbacks are largely obviated is known from U.S. Pat. No. 3,595,804. In this method the sulfur-containing atmosphere is formed in the reaction vessel itself during the heat treatment. To this end the reaction mixture is mixed with a quantity of carbon, for example, in the form of active carbon grains and a quantity of sulfur. During the heat treatment predominantly $CS_2$ is formed from the admixed carbon and sulfur in the covered reaction vessel. This method has the drawback that after the heat treatment an extra operation, namely separation of the reaction product from the carbon grains is to be carried out. This separation may be performed, for example, by sieving. Complete separation of the carbon from the luminescent sulfide is, however, difficult to perform in practice. This is predominantly a result of the fact that the reaction product generally has the shape of a lightly sintered mass which must be pulverized after which the sieving operation can be carried out. During pulverisation and sieving a quantity of fine carbon particles is formed which cannot be separated in a simple way from the luminescent sulfide. When providing the luminescent sulfide in a luminescent screen, for example, of a cathode-ray tube a further diminishing of the carbon particles is generally affected. The presence of carbon particles, particularly very fine particles in a luminescent screen is disturbing because part of the emitted light is absorbed thereby so that, for example, upon excitation by electrons an unwanted decrease in brightness of the luminescent screen occurs.

The object of the invention is to provide a method of manufacturing luminescent sulfides in which a sulfur-containing atmosphere is likewise produced during the heat treatment in the reaction vessel but in which the drawbacks of the method known from U.S. Pat. No. 3,595,804 are obviated.

According to the invention a method of manufacturing a luminescent sulfide of at least one of the elements zinc and cadmium which sulfide is self-activated or is activated by at least one of the elements silver, copper and gold and is coactivated by at least one of the elements aluminium, gallium, indium, scandium and the rare earths, in which are introduced into a reaction vessel a reaction mixture (a) comprising zinc sulfide and/or cadmium sulfide and/or zinc-cadmium sulfide and the activator and co-activator elements in the desired quantities in the form of compounds of these elements and furthermore a material (b) from which a carbon-sulfur compound and/or hydrogen sulfide can be produced upon heating, whereafter the reaction vessel is closed and is subsequently heated at a temperature of between 950° and 1250°C, is characterized in that the material (b) is introduced into the reaction vessel in separation from the reaction mixture (a) by means of a partition, while material transport between (b) and (a) can take place through the gas phase.

In a method according to the invention the material from which a carbon-sulfur compound and/or hydrogen sulfide can be produced is not homogeneously mixed with the reaction mixture as in the method known from U.S. Pat. No. 3,595,804 but is introduced into the reaction vessel while it is separated from the reaction mixture by means of a partition. Material transport between the material ($b$) and the reaction mixture ($a$) is then possible through the gas phase. Experiments which have led to the invention have surprisingly shown that the formation of the sulfur-containing atmosphere need not necessarily take place uniformly distributed over the reaction mixture. Luminescent sulfides whose trivalent coactivator ions are very satisfactorily built in the crystal lattice are obtained by a method according to the invention in which the sulfur-containing atmosphere is locally formed in the reaction vessel. A method according to the invention has the further advantage that the obtained luminescent sulfides are not impurified by carbon particles. The brightness of the luminescent sulfides according to the invention upon excitation by electrons is therefore very high. Brightnesses which are equal to those of the sulfides manufactured in accordance with known methods by heating a reaction mixture while passing through hydrogen sulfide can be obtained with these sulfides.

A layer of quartz wire filling may be used, for example, as a partition between the material ($b$) and the reaction mixture ($a$). The material ($b$) is then provided on the bottom of the reaction vessel whereafter the layer of the quartz wire filling and subsequently the reaction mixture are provided. The quartz wire partition prevents impurification of the reaction mixture ($a$) with the material ($b$) and permits of transport of gases between ($a$) and ($b$).

In a preferred embodiment of the method according to the invention the partition consists of at least one holder which is provided with one or more apertures. This holder is filled with the material ($b$) and is placed in the reaction vessel in the vicinity of the reaction mixture ($a$). In this method the holder can very easily be removed from the reaction vessel after the heat treatment whereafter the reaction product can be processed in known manner for the manufacture of luminescent screens.

The said holder for the material ($b$) preferably consists of a tube of refractory material, for example, quartz whose wall is provided with perforations. This tube is placed in the reaction vessel in such a manner that it is largely or completely surrounded by the reaction mixture.

In a method according to the invention the use of a material ($b$) mainly producing carbon disulfide upon heating is preferred. In fact, it has been found that very satisfactory results are obtained with a carbon disulfide atmosphere.

Such a material which produces carbon disulfide and which can be used to great advantage in a method according to the invention is active carbon wherein is incorporated a quantity of sulfur. This material can be manufactured by heating a mixture of active carbon and sulfur. During the heat treatment for the manufacture of the luminescent sulfide this material predominantly produces carbon disulfide and furthermore comparatively small quantities of organic sulfides and hydrogen sulfide.

In a method according to the invention a mixture of active carbon and sulfur is preferably used as a starting material for the material ($b$). During the first phase of the heat treatment for the manufacture of the luminescent sulfide the sulfur is at least partly taken up by the carbon. The material ($b$) thus formed produces the desired carbon disulfide atmosphere during the further heat treatment.

Furthermore it is possible in a method according to the invention to use active carbon as a starting material for the material ($b$). The reaction mixture ($a$) is then mixed with sulfur. Sulfur is at least partly taken up by carbon during the heat treatment and the material ($b$) thus formed produces the desired carbon disulfide atmosphere.

If, in a method according to the invention, active carbon incorporating a quantity of sulfur is used as material ($b$), a quantity of carbon of between 1 and 100 g and a quantity of sulfur of between 5 and 200 g per 1000 g of reaction mixture ($a$) is preferably chosen.

Manufacture according to the invention of luminescent sulfides comprising a quantity of activator elements of between 0.001 and 0.1 atom % and a quantity of coactivator elements of between 0.001 and 0.5 atom % both calculated with respect to combined zinc and cadmium is preferred because the said quantities lead to the most efficient luminescent materials.

The highest brightnesses are obtained with luminescent sulfides manufactured by a method according to the invention comprising silver, and/or copper as an activator and aluminium as a coactivator. Such luminescent sulfides are therefore preferred.

The invention will now be further described with reference to a drawing and a number of examples.

The drawing shows partly in a cross-section an embodiment of a reaction vessel provided with a reaction mixture ($a$) and a holder containing a material ($b$) which reaction vessel can be used for performing a method according to the invention.

In the drawing, the reference 1 is a quartz crucible covered by a quartz cover 2 and filled with a reaction mixture 3 from which a luminescent sulfide can be formed upon heating. A quartz glass tube 4 is placed in the crucible 1 in such a manner that the tube is completely surrounded by the reaction mixture 3. The tube 4 is provided with a number of apertures 5 through which material transport is possible via the gas phase between the interior of the tube 4 and the reaction mixture 3. The tube 4 is filled with a material 6 from which a carbonsulfur compound and/or hydrogen sulfide can be produced upon heating. The lower side of the tube 4 is closed by means of a quartz wire filling stud 7. The crucible 1 has a content of approximately ½ liter, its height is approximately 15 cm and its upper side has a diameter of approximately 11 cm. The tube 4 has a diameter of approximately 3.5 cm and a height of approximately 10 cm.

EXAMPLE 1

A quantity of 4500 g pf ZnS is suspended in water. 0.452 g of silver in the form of silver nitrate and 0.113 g of aluminium likewise as a nitrate are added to this suspension. The suspension is subsequently evaporated to dryness whereafter the product obtained is homogenized. 500 g of the reaction mixture thus obtained are mixed with 15 g of sulfur and provided in a crucible as shown in the drawing. A mixture of 10 g of sulfur and 10 g of active carbon is introduced into a quartz glass perforated tube as shown in the drawing. Subsequently this tube is placed in the crucible in such a manner that it is completely surrounded by the reaction mixture. The crucible is then closed by means of a cover and subsequently heated for 1 hour at a temperature of 1100°C. After cooling the crucible contents having the shape of a lightly sintered mass completely surrounding the quartz glass tube are removed from the crucible. The quartz glass tube can easily be separated from the reaction product. The reaction product which is ready for use after homogenisation and sieving consists of a blue-luminescing zinc sulfide activated by silver and coactivated by aluminium. The luminescent sulfide obtained is found to have no carbon particles and has the same brightness upon electron excitation as a luminescent sulfide of the same composition and obtained in known manner by heating a reaction mixture while passing through hydrogen sulfide.

EXAMPLE 2

Operations are carried out analogously as described in example 1. The starting mixture is, however, a suspension of 920 g ZnS and 80 g CdS in water to which 0.032 g of copper as copper sulfate and 0.014 g of aluminium as aluminium sulfate have been added. After evaporation to dryness and homogenisation 500 g of the reaction mixture obtained are mixed with 15 g of sulfur and then introduced into the crucible. The quartz glass tube is provided with 10 g of active carbon. After heating for 1.5 hours at 1050°C a green-luminescing zinc-cadmium sulfide activated by copper and coactivated by aluminium is obtained which is free from carbon particles and which upon electron excitation has the same brightness as a sulfide of the same composition obtained in accordance with a known method in which a hydrogen sulfide stream is passed through the reaction mixture during the heat treatment.

EXAMPLE 3

A yellow-luminescing zinc-cadmium sulfide activated by copper and coactivated by aluminium is manufactured by the method as described in example 1. The starting mixture is a suspension of 850 g of ZnS and 150 g of CdS in water to which 0.062 g of copper as a sulfate and 0.053 g of aluminium as a sulfate have been added. 500 g of the reaction mixture obtained are introduced into the crucible. The quartz glass tube is provided with a mixture of 25 g of sulfur and 10 g of active carbon. The crucible with the contents is heated for 2 hours at a temperature of 1025°C. The luminescent sulfide thus obtained is free from carbon particles and has a brightness which is substantially equal to that of a sulfide of the same composition manufactured by means of passing a hydrogen sulfide stream through the reaction mixture during the heat treatment.

EXAMPLE 4

A blue-luminescing zinc sulfide which is self-activated and contains aluminium as a coactivator is manufactured starting from a reaction mixture consisting of zinc sulfide and the aluminium coactivator. 500 g of this reaction mixture are heated in a crucible for 1 hour at a temperature of 1050°C. During the heat treatment the desired sulfur-containing atmosphere is formed in the crucible by a mixture of 10 g of active carbon and 25 g of sulfur present in a perforated quartz glass tube. This tube is placed in the crucible in such a manner that it is completely surrounded by the reaction mixture.

What is claimed is:

1. In the method of manufacturing a luminescent sulfide of at least one of the elements selected from the group consisting of zinc and cadmium, said luminescent sulfide being self-activated or activated by at least one element selected from the group consisting of silver, copper and gold and coactivated by at least one element selected from the group consisting of aluminum, gallium, indium, scandium and the rare earth metals comprising introducing into a reaction vessel a reaction mixture comprising at least one compound selected from the group consisting of zinc sulfide and cadmium sulfide and the desired quantities of compounds of the coactivator and activator elements and a mixture of carbon and sulfur, said mixture being capable upon heating of producing carbon disulfide, closing said vessel and heating said vessel to a temperature between 950° and 1250°C, the improvement wherein said carbon is separated from said reaction mixture by a gas permeable partition and the carbon disulfide produced by the reaction of said carbon and sulfur at said temperature is transported to the reaction mixture by diffusion through said gas permeable partition while in the gaseous state.

2. The method of claim 1 wherein the carbon is contained in an aperture provided holder contained within the reaction vessel.

3. The method of claim 2 wherein the holder consists of a tube of a refractory material provided with perforations in the wall and is surrounded by the reaction mixture.

4. The method of claim 1 wherein the carbon and sulfur capable of forming the carbon disulfide is a mixture of active carbon and sulfur.

5. The method of claim 4 wherein the quantity of carbon is between 1 and 100 grams and the quantity of sulfur is between 5 and 200 grams per 1000 grams of the reaction mixture.

6. The method of claim 1 wherein from 0.001 to 0.1 atom % of the activator and 0.001 to 0.5 atom % of the coactivator is used calculated with respect to the zinc and cadmium present.

7. The method of claim 6 wherein the activator is at least one element selected from the group consisting of silver and copper and the coactivator is aluminum.

* * * * *